United States Patent
Collins

(12) United States Patent (10) Patent No.: US 8,981,905 B2
Collins (45) Date of Patent: Mar. 17, 2015

(54) SECURE ASSET TRACKING SYSTEM

(75) Inventor: David J. Collins, Duxbury, MA (US)

(73) Assignee: A2B Tracking Solutions, Inc, Portsmouth, RI (US)

(*) Notice: Subject to any disclaimer, the term of this patent is extended or adjusted under 35 U.S.C. 154(b) by 376 days.

(21) Appl. No.: 13/573,396

(22) Filed: Sep. 13, 2012

(65) Prior Publication Data

US 2013/0257594 A1 Oct. 3, 2013

Related U.S. Application Data

(60) Provisional application No. 61/686,060, filed on Mar. 30, 2012.

(51) Int. Cl.
*H04Q 5/22* (2006.01)
*G06K 7/01* (2006.01)
*G06Q 10/08* (2012.01)

(52) U.S. Cl.
CPC ............. *G06K 7/01* (2013.01); *G06Q 10/0833* (2013.01)
USPC . 340/10.1; 340/572.1; 340/5.92; 340/539.13; 340/568.1; 235/385; 705/28

(58) Field of Classification Search
CPC . G06K 7/0008; G06Q 10/08; G06Q 10/0833; G06Q 20/203; G06Q 10/087; G06Q 10/08355; G06Q 10/0838; G06Q 10/0875; G06Q 10/06
USPC ............ 340/5.92, 10.1, 539.13, 568.1, 572.1, 340/686.1; 705/28; 235/385; 706/50
See application file for complete search history.

(56) References Cited

U.S. PATENT DOCUMENTS

| | | | | |
|---|---|---|---|---|
| 6,237,051 | B1* | 5/2001 | Collins | 710/36 |
| 7,518,511 | B1* | 4/2009 | Panja et al. | 340/572.1 |
| 7,688,208 | B2* | 3/2010 | Schuler et al. | 340/572.1 |
| 7,755,518 | B2* | 7/2010 | Hersh et al. | 340/988 |
| 2003/0130912 | A1* | 7/2003 | Davis et al. | 705/28 |
| 2005/0071193 | A1 | 3/2005 | Kalies | |
| 2005/0140502 | A1 | 6/2005 | Ashizawa | |
| 2005/0246092 | A1* | 11/2005 | Moscatiello | 701/207 |
| 2006/0288003 | A1 | 12/2006 | Desai et al. | |
| 2007/0010940 | A1* | 1/2007 | Tan et al. | 701/207 |
| 2007/0035397 | A1* | 2/2007 | Patenaude et al. | 340/572.1 |
| 2007/0109125 | A1* | 5/2007 | Zhang et al. | 340/572.1 |
| 2007/0150356 | A1 | 6/2007 | Kapsambelis et al. | |
| 2008/0143484 | A1* | 6/2008 | Twitchell | 340/10.1 |
| 2009/0021369 | A1* | 1/2009 | Ulrich | 340/539.13 |

(Continued)

*Primary Examiner* — Brian Zimmerman
*Assistant Examiner* — An T Nguyen
(74) *Attorney, Agent, or Firm* — L. J. Marhoefer

(57) ABSTRACT

An asset tracking technology wrings from a scan, event, location, and personal data in combination, immense mounds of useful information about the assets by interacting this information with Points of Data via cloud processing and analytics. The system tracks each asset at each location starting at its initial location and thereafter at each succeeding location, including time taken and steps involved as reported by each player in the supply chain. Each asset and each critical embedded component has a tag or mark that uniquely identifies it. Each tag is registered in a cloud-hosted database. Each sending and each receiving location will input the tag information with a scanner. This data flowing from the tracking model is transmitted to the cloud-hosted database for processing using Big Data Analytics techniques and artificial intelligence expert systems tools to determine the probably of a deviation from a normative established by the expert system based on the collected data.

8 Claims, 2 Drawing Sheets

(56) References Cited

U.S. PATENT DOCUMENTS

| | | |
|---|---|---|
| 2009/0043504 A1* | 2/2009 | Bandyopadhyay et al. .. 701/213 |
| 2011/0006882 A1* | 1/2011 | Twitchell, Jr. ............... 340/10.1 |
| 2011/0050424 A1* | 3/2011 | Cova et al. ................. 340/572.1 |
| 2011/0054979 A1* | 3/2011 | Cova et al. ........................ 705/9 |
| 2012/0212331 A1* | 8/2012 | Jones et al. ................ 340/10.52 |
| 2012/0303498 A1* | 11/2012 | Cova et al. ...................... 705/34 |
| 2012/0310854 A1* | 12/2012 | Cova et al. .................... 705/333 |
| 2013/0027200 A1* | 1/2013 | Ukita et al. ............... 340/539.13 |
| 2013/0054780 A1* | 2/2013 | Bade et al. .................... 709/224 |
| 2013/0257594 A1* | 10/2013 | Collins ....................... 340/10.1 |
| 2013/0268501 A1* | 10/2013 | Gorinevsky .................. 707/693 |

\* cited by examiner

SECURE ASSET TRACKING SYSTEM

RELATED APPLICATION

This application claims priority of provisional application No. 61/686,060, filed Mar. 30, 2012 which is incorporated herein by reference.

FIELD OF THE INVENTION

This invention relates to system that tracks assets as they move from one location to another in order to flag anomalies in the movement and/or handling of an asset. More particularly, it relates to such a system that tracks a large diverse population of assets and locations where new assets and new locations are continuously added.

BACKGROUND OF THE INVENTION

The prior art has many asset tracking systems in which a label is applied to the asset. The label can be scanned in order to determine the location of the asset and thus provide a way to track its location. Currently, the labels most commonly used are one and two-dimensional bar code labels, and RFID code labels. The prior art includes tracking systems that are enterprise wide and provide a degree of security in tracking the asset's location and who has access to an asset. Examples of this prior art include the present inventor's U.S. Pat. Nos. 6,327,051 and 7,277,889, both of which are incorporated herein by reference.

These and other prior art systems, such as the Fed Ex package tracking model permits granular visibility to the supply chain and movement of important packages. But they do not satisfactorily provide a system for flagging anomalies in the movement and handling of an asset as it is moved between one location and another. For example, where a sensitive asset is moved from one location for repair or update to one or more different locations. The static asset tracking systems of the prior art do not provide a flexible, adaptive method to flag possible diversion of the asset during which unauthorized changes can be made or unauthorized repair parts used. This is particularly the case where there are a large number of different assets, a large number of locations, and different assets and additional locations are continuously added.

SUMMARY OF THE INVENTION

An object of this invention is the provision of a system that tracks a very large number of assets over an extended period of time and collects data from this tracking to build an data base from which an expert system can determine a probability of a deviation from a normative established by the expert system based on the collected data. An additional object of the invention is to build the expert database that reliably flags possible diversions while at the same time minimizing false indications of possible diversion. A still further object of the invention is the provision of a system that can detect the introduction of counterfeit parts as components of an asset or assets.

Briefly, this invention contemplates a method and system with serial asset marking, marking registration, and tracking technology that taps the "Hundreds of Millions of Points of Data" in a global community of data and wrings from a scan, event, location, personal combination immense mounts of useful information about these assets by interacting this information with the Points of Data via cloud processing and analytics. The system tracks each asset at each location starting at its initial location and thereafter at each succeeding location as it moves from one location to another, including time taken and steps involved reported by each player in the supply chain for each item. Each asset and each critical embedded component has a tag or mark that uniquely identifies it such as, for example a Unique Item Identification (UID) tag or other suitable tag, preferably a tag that serially identifies the asset and an a tag that serially identifies its critical components. Each tag is registered in a cloud-hosted database. Each sending and each receiving location will input the tag information with a scanner, a GPS verified asset location, repair sub-location(s), event time stamp, personal identity, and repair step performed. This data flowing from the tracking model is transmitted to the cloud-hosted database for processing using Big Data Analytics techniques and artificial intelligence expert systems tools to determine the probably of a deviation from a normative established by the expert system based on the collected data.

The artificial intelligent component employs one, or a combination of methodologies, for building models, from which models, an inferences can be drawn about a particular transaction in order to make a determination that the transaction merits or does not merit a flag. The artificial intelligence component can employ numerous methodologies for learning from past data of asset movements and other data parameters. These methodologies include Hidden Markov Models (HMMs) and related prototypical dependency models, more general probabilistic graphical models, such as Bayesian networks, for example created by a structure search using a Bayesian model score or approximation, linear classifiers, such as support vector machines (SVMs), nonlinear classifiers, such as methods referred to as "neural network" methodologies, fuzzy logic and other approaches that perform data fusion. These methodologies also include methods for the capture of logical relationships such as theorem provers and heuristic rule based expert systems.

The expert software builds a profile for an asset class of the same or similar type with the same or similar movements based on the historic data record of actual tracking data for previous movement of this class of assets. For example, at an initial location, data is inputted to the database identifying the asset, its location initially; its intended ship to location, and the time when the asset is shipped. At the ship to location, similar data is entered. This data from the initial location and from the ship to location is compared to an expert model based on data from similar movements of similar assets. If the data from this asset falls outside the parameters of the expert system, the system flags the asset for inspection.

BRIEF DESCRIPTION OF THE DRAWINGS

The subject matter that is regarded as the invention is particularly pointed out and distinctly claimed in the claims at the conclusion of the specification. The forgoing and other objects, features, and advantages of the invention are apparent from the following detailed description taken in conjunction with the accompanying drawings in which:

DETAILED DESCRIPTION OF THE INVENTION

Figure 1:
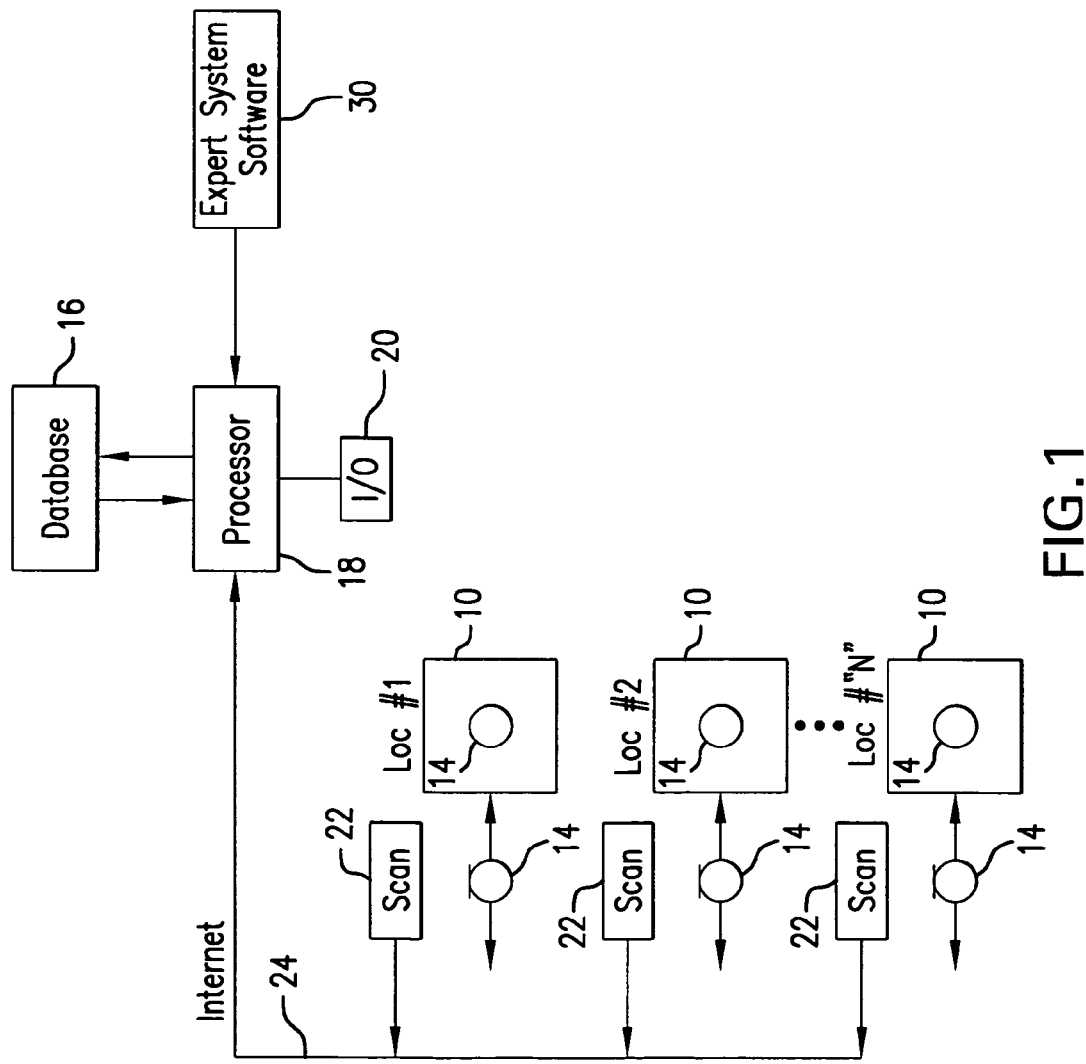
FIG. 1 is a block diagram illustrating components of the invention in an enterprise environment, which has a large number of locations and a large number of assets that move between locations within and outside the enterprise.

Referring now to FIG. 1 of the drawings, the blocks with the reference number 10 illustrate locations within the enterprise where assets are located and moved into and out of. For the purpose of illustrating the invention, locations numbered 1, 2 and N are shown in the drawing. Some are assumed to have been part of the system for a considerable period of time, and others are assumed to have been newly or recently added as part of the system.

Circle 14 at each location 10 represents a large number of different assets. Although not necessarily the situation at every location, some of the assets have been part of the system for a period of time, and some of the assets are new or recently added to the system.

Each asset, and its critical embedded components, has a unique identifier tag or mark, such as a UID, that is registered in a cloud-hosted database 16 via a processor 18. As will be appreciated by those skilled in the art, while each tag is unique to the tagged asset, the tag also points to data in the database 16 that allows the asset to be classified with the same assets and similar assets. In addition to the data encoded on the tag, the database includes other information linked in the database to the asset's class. This additional information is inputted into the database with a relational tie to the asset and/or asset class and can be used by the expert system in flagging an anomalous incident in the movement of the asset. This additional information may include, for example, an assessment of the vulnerability of the class of assets to so-called malware or to substitution of unauthorized part replacement and to an expected frequency with which a class of assets is moved. It advantageously includes also an assessment of the locations. Also included is a feedback input/output mechanism 20 that allows update inputs to the database of information that can be used in the expert system analysis, such as actual incidents of an asset being infected with malware or repaired with unauthorized parts.

The tag may employ any suitable technology, usually a scannable two-dimensional bar code tag or RFID tag. Data about each asset as it moves out from and into a location 10 (indicated by the arrows) is read by scanning input device 22 and coupled to the database 16 via the processor 18 and the Internet 24. The input device 22 includes a scanner that reads the tag data and also provides GPS verified asset location data, repair sub-location(s), event time stamp data, personal identity data, and repair/alteration step(s) performed. This data flowing from the tracking input device is transmitted via an Internet link 24 to the cloud-hosted processor 18 and database 16. The data is processed using Big Data Analytics techniques and/or additional artificial intelligence expert system software programs 30 to determine the probably of a deviation from a normative established by the expert system based on the data collected from a large number of the same or similar transactions with the same or similar assets.

It will be appreciated that over even a short period of time, the database will have stored in it data from an enormous number of asset movements from one location to another and usually back. The cloud-based processor 18, using the expert system software 30, classifies the data from previous asset movements into a data set that matches as closely as practical the data for each new movement. The criteria include the same and/or similar assets with the same and/or similar locations, asset repair/alteration, etc. The processor, using the expert system software, then generates a probable range for the data from each successive input from device 22 as the asset moves from one location to another. If the new data falls outside of the range by an unacceptable amount, the processor generates a flag output indicating the asset should be inspected.

It will be appreciated that the practice of this invention is a powerful tool in detecting and preventing the use of counterfeit parts in asset repair. Tagging component parts, with their information in the database 16, makes it relatively easy for the expert system software 30 to flag counterfeit parts. Every part is scanned before it is replaced with a new part. The replacement part has a unique tag and the replacement part tag information is registered in the database 16 along with its pedigree including previous locations. The replacement part tag is scanned, and the expert system software 30 matches the scanned information with the replacement part information registered in the database 16. If the scanned part is not registered in the database, the expert system will flag it as a possible counterfeit. A counterfeiter would not be able to counterfeit and register a counterfeit tag in the database with the proper pedigree including a unique part number that is consistent with the sequence of part numbers assigned to authentic parts.

Figure 2:
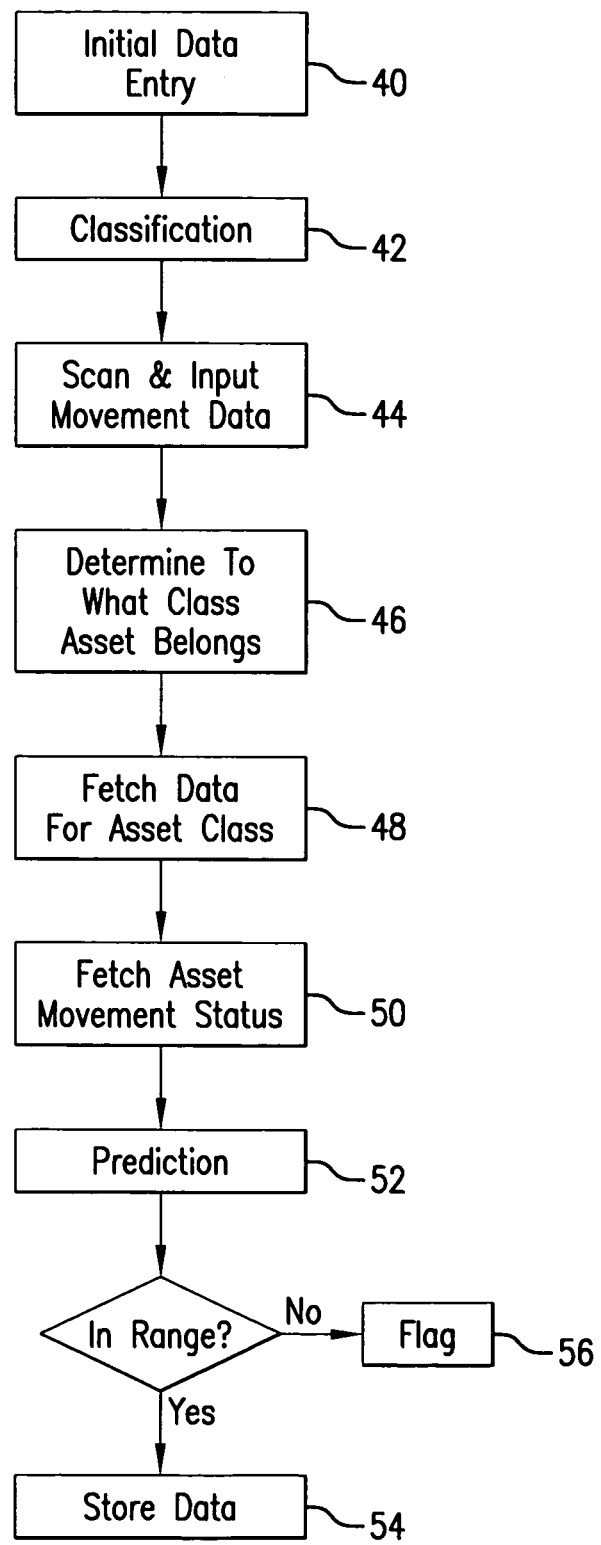
FIG. 2 is a flow diagram of one embodiment of steps in implementing the teachings of this invention.

Referring now to FIG. 2, which outlines the steps in the practice of the invention. In an initial data entry step 40, the unique tag of each asset and/or part with their respective locations is entered into the database 16. In an initial classification step 42, the expert software using, for example, Big Data Analytics classifies each asset and each part. For example, an asset and a part is respectively included in a class where they are the same type (or similar types where the same type class has two few members) and in a class for same type assets and/or parts in the same home location. Step 44 scans and inputs data associated with the movement of each asset and/or part. Step 46 determines the class to which the moved asset and/or belongs. Step 48 fetches the stored data for previous movements of this class of assets. The processor fetches from the database the movement status of the asset, step 50. A suitable expert system program is used to process the stored data for the class of assets and make a prediction of the expected parameters for the asset at this stage in its movement, step 52. For example, based on the stored data for the class to a given point at which there is a new input from an asset, the expert system can make a prediction using a Hidden Markov Models (HMMs) and related prototypical dependency models to predict a range in which the new input data should fall. If the new data falls within the predicted range, the new data is added to the stored movement as another data point, step 54. If the new data falls outside the range, the processor generates a "flag message" that is outputted to I/O terminal 20, step 56. The expert software can tailor the flag message based on a perceived need for action. The flag message can simply alert the supply chain management that an abnormal situation has been detected. In addition, the flag message can be a call to action based on an expert system evaluation of the situation. The flag message can call for an asset to be directed to a new location instead of the location originally intended. Similarly the flag message generated by the expert system can order an immediate halt to further movement of the asset. In the case of counterfeit assets and/or parts, the expert system software can be programmed to include recommended supply chain penalties and the flag message can include a recommended penalty upon a determination of a counterfeit asset and/or part.

The capabilities of the present invention can be implemented in software, firmware, hardware or some combination thereof. As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

The invention claimed is:

1. A system that tracks assets as they move from one location to another location in order to detect anomalies in the movement and/or handling of an asset comprising in combination:
   - a tag attached to each of said assets that stores a code that uniquely identifies each of said assets;
   - a database in which is stored data for each of said assets to which data said code points:
   - a computer processor coupled to said data base;
   - an expert system program coupled to said processor;
   - said processor accessing said expert system program and said data base to classify said assets into classes with common proprieties;
   - a tag reader input device that reads said tag attached to an asset as said asset is moved from one location as it is received at another location, said input device reading the time and location of said one location and said another location;
   - said tag reader input device coupled to said database and storing in said database data parameters including location and time of each location of said assets in accordance with classification to which an asset has been assigned;
   - said processor accessing said expert system program and said data base to build a predictive model for a class from the stored data parameters for assets of that class;
   - said processor accessing said expert system program and said predictive model for a class and comparing said data parameters for an asset movement with said predictive model and generating a flag message when said data parameters do not match said predictive model within predetermined range.

2. A method that tracks assets as they move from one location to another location in order to detect anomalies in the movement and/or handling of an asset including the steps of:
   - attaching a tag to each of said assets that stores a code that uniquely identifies each of said assets;
   - storing in a database data for each of said assets to which data said code points:
   - coupling a computer processor to said data base;
   - coupling an expert system program to said processor;
   - said processor accessing said expert system program and said data base to classify said assets into classes with common proprieties;
   - reading said tag attached to an asset as said asset is moved from one location to and as said asset is received at another location and also recording the time of reading and location of said one location and the time of reading and location of said another location;
   - storing in said database data parameters including location and time of each said assets at each location in accordance with classification to which an asset has been assigned;
   - accessing said expert system program and said data base to build a predictive model for a class from the stored data parameters for assets of that class;
   - accessing said expert system program and said predictive model for a class and comparing said data parameters for an asset movement with said predictive model and;
   - generating a flag message when said data parameters do not match said predictive model within predetermined range.

3. A system that tracks assets as they move from one location to another location in order to detect anomalies in the movement and/or handling of an asset as in claim 1 wherein said flag message calls for an asset to be directed to a new location instead of the location originally intended.

4. A system that tracks assets as they move from one location to another location in order to detect anomalies in the movement and/or handling of an asset as in claim 1 wherein said flag message orders an immediate halt to further movement of the asset.

5. A system that tracks assets as they move from one location to another location in order to detect anomalies in the movement and/or handling of an asset as in claim 1 wherein said flag message recommends supply chain penalties.

6. A method that tracks assets as they move from one location to another location in order to detect anomalies in the movement and/or handling of an asset as in claim 2 wherein said flag message calls for an asset to be directed to a new location instead of the location originally intended.

7. A method that tracks assets as they move from one location to another location in order to detect anomalies in the movement and/or handling of an asset as in claim 2 wherein said flag message orders an immediate halt to further movement of the asset.

8. A method that tracks assets as they move from one location to another location in order to detect anomalies in the movement and/or handling of an asset as in claim 2 wherein said flag message recommends supply chain penalties.

* * * * *